United States Patent Office 2,761,867
Patented Sept. 4, 1956

2,761,867

ALUMINUM SALTS OF ALLANTOIN AND THEIR PREPARATION AND COMPOSITIONS COMPRISING THE SAME

Sebastian B. Mecca, Feasterville, Pa., assignor to Schuylkill Chemical Company, Philadelphia, Pa., a corporation of Delaware No Drawing. Application August 11, 1955,
Serial No. 527,866

18 Claims. (Cl. 260—299)

The present invention relates to novel chemical compounds; and, more particularly, the invention relates to novel salts of aluminum and allantoin possessing valuable therapeutic and cosmetic properties. The invention also relates to a method for preparing the novel compounds.

Various aluminum compounds have been used medicinally and cosmetically, both internally and externally. For example, aluminum hydroxide has been administered internally for the treatment of peptic gastric ulcers; and soluble aluminum salts, such as aluminum sulfate, aluminum chloride, aluminum chlorhydroxide, and the like, have been used as hemostatic agents, such as in styptic pencils, and as astringents in deodorant and anti-perspirant products. Although aluminum hydroxide posseses a desirable antacid action and leaves an astringent coating at the area of the peptic ulcer, it does nothing to repair the broken down tissues and heal the condition. The various aluminum salts, as has been established, are often irritating, particularly if chafing, inflammation or ulceration is already present at the site to which they are applied. Deodorants containing aluminum salts and applied to the body are generally subsequently absorbed by the clothing, resulting in a destructive action to the fabric.

Allantoin, on the other hand, is known to possess a soothing, pain-relieving action as well as healing properties due to its marked cell-proliferating activity. Salts of allantoin, however, are not very well known, only the ammonium, bismuth and silver salts of allantoin having received any significant recognition as being possibly useful compounds.

It is the principal object of the present invention to provide novel chemical compounds and a method for the preparation thereof.

It is another object of the present invention to provide novel chemical compounds possessing the soothing and healing action of allantoin and the astringent action of aluminum, without however, the irritating and fabric deteriorating characteristics of the usual aluminum compounds.

Still another object of the present invention is to combine aluminum and allantoin to provide a compound retaining the astringent properties of the aluminum and the soothing and healing properties of allantoin without the irritating effect of usual aluminum compounds.

Other objects, including the provision of novel method for preparing the products of the invention, will become apparent from a consideration of the following specification and claims.

The novel compounds of the present invention are aluminum salts of allantoin.

It has been found that aluminum compounds and allantoin can be combined in the form of complex salts to provide products still possessing the soothing and healing properties of allantoin, and the astringent properties of aluminum compounds without, however, possessing the irritant characteristics of usual aluminum salts or the destructive action of such aluminum salts on fabrics. For example, although aluminum chloride and aluminum sulfate are acid compounds possessing irritating properties, they can be combined with allantoin to provide aluminum chlorallantoinate or aluminum sulfate allantoin which are nearly neutral and possess no significant irritating properties. With the compounds of the present invention, therefore, many of the limitations of prior aluminum compounds are overcome. Thus, the compounds of the invention can be administered externally or internally where aluminum compound therapy or activity is called for not only without the irritating characteristics of prior aluminum salts but also with a positive soothing and healing action. Compounds of the invention, especially aluminum hydroxy allantoinate, may be employed in the treatment of peptic gastric ulcers where they will exert a desirable antacid action and leave an astringent coating on the ulcerated area while at the same time repairing broken down tissue and cells thereby stimulating quick healing of the area. The compounds of the invention may also be employed externally in such compositions as deodorant, anti-perspirant and hemostatic compositions, and compositions for the treatment of dermatological irritations, such as ulcerations, rashes, and the like, where the astringent properties of the product are utilized at the same time providing a soothing and healing action. The compounds of the invention can be applied to sensitive and infected areas without danger of further aggravation of the irritated surfaces. Because the compounds of the present invention have a buffering and soothing action they may be used in conjunction with conventional aluminum compounds in preparation.

The salts will be in the form of complex compounds containing a radical or radicals in addition to the aluminum and the allantoin radical. Hence the salts may be aluminum hydroxy allantoinate, Al(OH)$_2$C$_4$H$_5$N$_4$O$_3$; aluminum chlorhydroxy allantoinate,

Al$_2$(OH)$_4$ClC$_4$H$_5$N$_4$O$_3$ aluminum sulfam allantoinate, Al$_2$(SO$_3$NH)$_2$C$_4$H$_5$N$_4$O$_3$; aluminum sulfate allantoinate, AlSO$_4$C$_4$H$_5$N$_4$O$_3$; aluminum chlor allantoinate AlCl$_2$C$_4$H$_5$N$_4$O$_3$; aluminum acetate allantoinate, Al(CH$_3$COO)$_2$C$_4$H$_5$N$_4$O$_3$; aluminum ammonium sulfate allantoinate, AlNH$_4$SO$_4$(C$_4$H$_5$N$_4$O$_3$)$_2$; aluminum benzoate allantoinate, Al(C$_7$H$_5$O$_2$)$_2$C$_4$H$_5$N$_4$O$_3$; aluminum brom allantoinate, AlBr$_2$C$_4$H$_5$N$_4$O$_3$; aluminum iodo allantoinate, AlI$_2$C$_4$H$_5$N$_4$O$_3$; aluminum lactate allantoinate, Al(CH$_3$CH(OH)COO)$_2$C$_4$H$_5$N$_4$O$_3$; aluminum phenolsulfonate allantoinate,

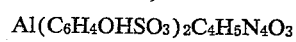

Al(C$_6$H$_4$OHSO$_3$)$_2$C$_4$H$_5$N$_4$O$_3$ aluminum potassium sulfate allantoinate,

AlKSO$_4$(C$_4$H$_5$N$_4$O$_3$)$_2$ aluminum salicylate allantoinate,

Al(C$_6$H$_4$OHCOO)$_2$C$_4$H$_5$N$_4$O$_3$ aluminum sodium sulfate allantoinate,

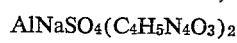

AlNaSO$_4$(C$_4$H$_5$N$_4$O$_3$)$_2$ and the like.

The presently preferred compounds are aluminum hydroxy allantoniate, aluminum chlorhydroxy allantoinate, aluminum chlor allantoinate, aluminum sulfate allantoinate and aluminum sulfam allantoinate.

The simple aluminum hydroxy allantoinate may be readily prepared by reacting, in aqueous medium, a water soluble aluminum compound with a water soluble salt of allantoin. As far as the aluminum compound reactant is concerned, it may be selected from a wide variety of aluminum salts so long as it is soluble in water. Examples of aluminum compounds that may be employed are aluminum chloride, aluminum chlorhydroxide, aluminum sulfamate, aluminum sulfate, aluminum nitrate, aluminum acetate, aluminum citrate, aluminum bromide, aluminum iodide, aluminum lactate, aluminum phenolsulfonate, double salts containing aluminum, for instance, sodium potassium aluminum sulfate, ammonium potassium aluminum sulfate, aluminum ammonium sulfate, aluminum ammonium chloride, aluminum potassium sulfate, aluminum potassium phenolsulfonate, aluminum sodium chloride, aluminum sodium sulfate, and the like. Concerning the allantoin salt, any salt of allantoin sufficiently soluble in water to permit the reaction to proceed may be employed. Examples of such salts are the alkali metal allantoinates, such as sodium allantoinate and potassium allantoinate, and ammonium allantoinate, and the like. The allantoin salt reactant may be formed in situ in solution as by dissolving allantoin itself in an aqueous solution of a suitable base such as sodium hydroxide, potassium hydroxide, ammonium hydroxide, or the like.

In order to precipitate the resulting aluminum hydroxy allantoinate, the reaction medium should have a pH not substantially in excess of 8. At highly acid pHs the aluminum hydroxy allantoinate only partially precipitates, and the proportion of compound precipitated increases with rising pHs approaching the neutral range. In accordance with the preferred practice of this embodiment of the invention, the pH of the medium is, therefore, maintained at above 4 and preferably between about 6 and about 7. A pH on the order of about 6.7–6.8 has been found to be particularly advantageous.

Because of the instability of soluble allantoin salts, high temperature should be avoided during this reaction. Since the reaction proceeds at a favorable rate of temperatures at or near room temperature, no marked advantage is obtained through the application of heat, although, if desired, moderately elevated temperatures may be employed, such as temperatures up to about 100° F. Reaction temperatures lower than room temperature may also be employed, and preferably are, and the temperature of the reaction medium may go down as low as about 35° F.

During the reaction, the aluminum hydroxy allantoinate forms as a gelatinous precipitate. This precipitate may be collected and dried, or it may be merely collected in the form of a gel and marketed and employed in that form.

The complex aluminum allantoin salts other than aluminum hydroxy allantoinate are most readily prepared by reacting the appropriate aluminum salt, such as those mentioned above, with allantoin itself. This reaction will generally take place at an elevated temperature ranging from about 150° F. up to the boiling point of water. One procedure which has been found to be particularly suitable in preparing the complex aluminum allantoin salts is to mix the allantoin and the appropriate aluminum salt in dry, finely-divided condition. Hot water, such as boiling water, is then added to the mixture with constant trituration. The entire reaction mixture solidifies, and the solid product can then be broken up and dried to provide the solid complex salt.

The products of the present invention find many uses in the medical and cosmetic fields. The products may be made up in the form of lotions, creams, gels, solid compositions including powders, and the like, for use as deodorant, anti-perspirant or hemostatic compositions and compositions for the treatment of various dermatological irritations, for internal remedies such as in the treatment of gastric peptic ulcers, and in other uses where the astringent and healing properties of the products can be utilized. In preparing medicinal or cosmetic compositions the salts of the present invention may be formulated with conventional pharmaceutical or cosmetic carrier media.

Those products of the present invention which may be prepared in the form of a gel, such as the aluminum hydroxy allantoinate, may be advantageously prepared, recovered, formulated and/or marketed in such form. Such gel is readily dispersed in water and possesses many properties making it extremely valuable as a cosmetic or medicinal product.

The preparation of the products of the present invention will be more readily understood from a consideration of the following specific examples which are given for the purpose of illustration only and are not intended to limit the scope of the invention in any way.

*Example I*

80 grams of allantoin are suspended in 1000 cc. of water. 1000 cc. of a cold 1 N sodium hydroxide solution are then added to the suspension with constant stirring. To the resulting sodium allantoinate solution are then added, with constant stirring, a cold aluminum chloride solution prepared by dissolving 122 grams of aluminum chloride in 1000 cc. of cold water. An additional 150 cc. of cold 1 N sodium hydroxide solution are then added with constant stirring, adjusting the pH to approximately 6.7. The mixture is stirred for an additional two hours. The resulting precipitate is allowed to settle and is washed by decantation twice. The precipitate is then collected and dried at 140° F. The resulting aluminum hydroxy allantoinate contains 24–25% $Al_2O_3$, 54–60% allantoin and the remainder water. The product is a greyish white to white powder which is insoluble in water.

*Example II*

In this example the procedure of Example I is followed, however, the settled and washed gelatinous precipitate is not dried but is filtered and allowed to drain for 48 hours. The resulting gel, containing 12–14% allantoin, 6–7% aluminum oxide and 79–82% water, is ready for use as such. The gel is particularly useful as an internal remedy for the treatment of various gastric irritations.

*Example III*

42 grams of aluminum chlorhydroxide are thoroughly mixed, in dry powdered form, with 32 grams of dry, finely-divided allantoin. To this mixture, with constant trituration, are added 20 cc. of boiling water. The entire material becomes a hard mass which is then broken up and dried. The resulting product, aluminum chlorhydroxy allantoinate, contains 35–40% allantoin, 48–50% aluminum chlorhydroxide (approximately 22.5% aluminum oxide), and the remainder water. The product is a yellowish white to white powder soluble in water to the extent of approximately 2 grams per 100 cc.

*Example IV*

The aluminum chlorhydroxy allantoinate of Example III is formulated into an anti-perspirant cream according to the following formula:

| | Percent by weight |
|---|---|
| Glycerol monostearate | 16.0 |
| Spermaceti | 3.0 |
| Titanium oxide | 1.0 |
| Water | 58.1 |
| Aluminum sulfate | 15.0 |
| Aluminum chlorhydroxy allantoinate | 5.0 |
| Sodium lauryl sulfate | 1.5 |
| Perfume | 0.4 |

The aluminum sulfate and aluminum chlorhydroxy allantoinate are dissolved in about one half the water. In the rest of the water is dissolved the sodium lauryl sulfate. Into this last solution are poured a molten mixture of the glycerol monostearate and the spermaceti with stirring. The aluminum sulfate-aluminum chlorhydroxy allantoinate solution is slowly added with stirring, to the resulting emulsion. The titanium dioxide powder is dusted in small portions, and the perfume is finally added.

*Example V*

The aluminum chlorhydroxy allantoinate is formulated into an after shave lotion according to the following formula:

|  | Percent |
|---|---|
| Water, by volume | 37.25 |
| Alcohol, by volume | 57.20 |
| Propylene glycol, by weight | 2.00 |
| Hexachlorophene, by weight | .25 |
| Aluminum chlorhydroxy allantoinate | 2.00 |
| Perfume | .3 |

The hexachlorophene and perfume are dissolved in the alcohol. The aluminum chlorhydroxy allantoinate is dissolved in the water and propylene glycol, and this solution is added slowly to the alcohol solution.

Considerable modification is possible in the selection of the aluminum compounds employed as reactant and in the nature of the resulting aluminum allantoin salts, as well as in the exact techniques and procedures employed in preparing the compounds without departing from the scope of the invention.

I claim:
1. An aluminum salt of allantoin.
2. Aluminum hydroxy allantoinate.
3. Aluminum chlorhydroxy allantoinate.
4. Aluminum sulfam allantoinate.
5. Aluminum chloro allantoinate.
6. Aluminum sulfate allantoinate.
7. The method of making aluminum hydroxy allantoinate which comprises mixing a soluble aluminum salt with a soluble salt of allantoin in aqueous medium at a pH below 8.
8. The method of claim 7 wherein the pH of the reaction mixture is above 4.
9. The method of claim 7 wherein the pH of the reaction mixture is between 6 and 7.
10. The method of claim 9 wherein the pH is on the order of about 6.7–6.8.
11. The method of making aluminum hydroxy allantoinate which comprises mixing a soluble aluminum salt with a soluble salt of allantoin in aqueous medium at a pH below 8 and at a temperature below about 100° F.
12. The method of claim 11 wherein the pH is above about 4, and wherein the reaction temperature is between about 35° F. and room temperature.
13. The method of making a complex salt comprising aluminum and allantoin which comprises mixing an aluminum salt with allantoin in aqueous medium at a temperature above about 150° F.
14. The method of claim 13 wherein the aluminum salt employed is aluminum chlorhydroxide.
15. The method of claim 13 wherein the aluminum salt employed is aluminum sulfamate.
16. The method of claim 13 wherein the aluminum salt employed is aluminum chloride.
17. The method of claim 13 wherein the aluminum salt employed is aluminum sulfate.
18. Medicinal and cosmetic compositions comprising an aluminum salt of allantoin and a carrier.

No references cited.